(12) United States Patent
Hillis et al.

(10) Patent No.: US 7,907,124 B2
(45) Date of Patent: Mar. 15, 2011

(54) METHOD AND APPARATUS CONTINUING ACTION OF USER GESTURES PERFORMED UPON A TOUCH SENSITIVE INTERACTIVE DISPLAY IN SIMULATION OF INERTIA

(75) Inventors: W. Daniel Hillis, Encino, CA (US); Bran Ferren, Beverly Hills, CA (US)

(73) Assignee: Touchtable, Inc., Pasadena, CA (US)

(*) Notice: Subject to any disclaimer, the term of this patent is extended or adjusted under 35 U.S.C. 154(b) by 1490 days.

(21) Appl. No.: 11/188,186

(22) Filed: Jul. 22, 2005

(65) Prior Publication Data
US 2006/0031786 A1 Feb. 9, 2006

Related U.S. Application Data

(63) Continuation-in-part of application No. 10/913,105, filed on Aug. 6, 2004.

(51) Int. Cl.
*G06F 3/041* (2006.01)
(52) U.S. Cl. ............ 345/173; 345/179; 178/18.01
(58) Field of Classification Search .......... 345/156–158, 345/173–179; 178/18.01–18.04, 19.01–19.03
See application file for complete search history.

(56) References Cited

U.S. PATENT DOCUMENTS

| | | | |
|---|---|---|---|
| 3,478,220 A | 11/1969 | Milroy | |
| 3,673,327 A | 6/1972 | Johnson | |
| 3,764,813 A | 10/1973 | Clement | |
| 3,775,560 A | 11/1973 | Ebeling | |
| 3,860,754 A | 1/1975 | Johnson | |
| 4,144,449 A | 3/1979 | Funk | |
| 4,245,634 A | 1/1981 | Albisser | |
| 4,247,767 A | 1/1981 | O'Brien | |
| 4,463,380 A | 7/1984 | Hooks, Jr. | |
| 4,507,557 A | 3/1985 | Tsikos | |
| 4,517,559 A | 5/1985 | Deitch | |
| 4,527,240 A | 7/1985 | Kvitash | |

(Continued)

FOREIGN PATENT DOCUMENTS

EP 0 881 591 12/1998

(Continued)

OTHER PUBLICATIONS

NCSA (National Center for Supercomputing Applications) GM Slab Console—Johnson and Curtis Univ. of Illinois 2003.

(Continued)

*Primary Examiner* — Kimnhung Nguyen
(74) *Attorney, Agent, or Firm* — Michael A. Glenn; Glenn Patent Group (57) ABSTRACT

A method and apparatus for operating a multi-user interactive display system including a display having a touch-sensitive display surface. A position is detected for each contact site at which the display surface experiences external physical contact. Each contact site's position history is using to compute velocity data for the respective contact site. At least one of the following is using to identify occurrence of one or more user gestures from a predetermined set of user gestures: the position history, the velocity data. Each user gesture corresponds to at least one predetermined action for updating imagery presented by the display as a whole. Action is commenced corresponding to the identified gesture. Responsive to a user gesture terminating with a nonzero velocity across the display surface, action is corresponding to the gesture is continued so as to simulate inertia imparted by said gesture.

15 Claims, 7 Drawing Sheets

U.S. PATENT DOCUMENTS

| | | | |
|---|---|---|---|
| 4,722,053 A | 1/1988 | Dubno | |
| 4,742,221 A | 5/1988 | Sasaki | |
| 4,746,770 A | 5/1988 | McAvinney | |
| 4,782,328 A | 11/1988 | Delinger | |
| 5,105,186 A | 4/1992 | May | |
| 5,239,373 A | 8/1993 | Tang et al. | |
| 5,379,238 A | 1/1995 | Stark | |
| 5,436,639 A | 7/1995 | Arai et al. | |
| 5,448,263 A | 9/1995 | Martin | |
| 5,483,261 A | 1/1996 | Yasutake | |
| 5,512,826 A | 4/1996 | Hardy et al. | |
| 5,528,263 A | 6/1996 | Platzker | |
| 5,971,922 A | 10/1999 | Arita | |
| 5,982,352 A | 11/1999 | Pryor | |
| 6,008,798 A | 12/1999 | Mato | |
| 6,057,845 A | 5/2000 | Dupouy | |
| 6,141,000 A | 10/2000 | Martin | |
| 6,215,477 B1 | 4/2001 | Morrison | |
| 6,232,957 B1 | 5/2001 | Hinckley | |
| 6,240,306 B1 | 5/2001 | Rohrscheib | |
| 6,280,381 B1 | 8/2001 | Malin | |
| 6,309,884 B1 | 10/2001 | Cooper | |
| 6,333,753 B1 | 12/2001 | Hinckley | |
| 6,335,722 B1 | 1/2002 | Tani | |
| 6,335,724 B1 | 1/2002 | Takekawa | |
| 6,337,681 B1 | 1/2002 | Martin | |
| 6,352,351 B1 | 3/2002 | Ogasahara | |
| 6,379,301 B1 | 4/2002 | Worthington | |
| 6,384,809 B1 | 5/2002 | Smith | |
| 6,414,671 B1 | 7/2002 | Gillespie | |
| 6,415,167 B1 | 7/2002 | Blank | |
| 6,421,042 B1 | 7/2002 | Omura | |
| 6,429,856 B1 | 8/2002 | Omura | |
| 6,487,429 B2 | 11/2002 | Hockersmith | |
| 6,504,532 B1 | 1/2003 | Ogasahara | |
| 6,512,936 B1 | 1/2003 | Monfre | |
| 6,518,959 B1 | 2/2003 | Ito | |
| 6,528,809 B1 | 3/2003 | Thomas | |
| 6,531,999 B1 | 3/2003 | Trajkovic | |
| 6,532,006 B1 | 3/2003 | Takekawa | |
| 6,563,491 B1 | 5/2003 | Omura | |
| 6,594,023 B1 | 7/2003 | Omura | |
| 6,608,619 B2 | 8/2003 | Omura et al. | |
| 6,636,635 B2 | 10/2003 | Matsugu | |
| 6,651,061 B2 | 11/2003 | Unchida et al. | |
| 6,654,620 B2 | 11/2003 | Wu | |
| 6,675,030 B2 | 1/2004 | Ciurczak | |
| 6,723,929 B2 | 4/2004 | Kent | |
| 6,747,636 B2 | 6/2004 | Martin | |
| 6,764,185 B1 | 7/2004 | Beardsley | |
| 6,765,558 B1 | 7/2004 | Dotson | |
| 6,788,297 B2 | 9/2004 | Itoh et al. | |
| 6,791,700 B2 | 9/2004 | Omura | |
| 6,803,906 B1 | 10/2004 | Morrison | |
| 6,810,351 B2 | 10/2004 | Katsurahira | |
| 6,825,890 B2 | 11/2004 | Matsufusa | |
| 6,828,959 B2 | 12/2004 | Takekawa | |
| 6,885,883 B2 | 4/2005 | Parris | |
| 6,888,536 B2 | 5/2005 | Westerman | |
| 6,922,642 B2 | 7/2005 | Sullivan | |
| 6,998,247 B2 | 2/2006 | Monfre | |
| 6,999,061 B2 | 2/2006 | Hara et al. | |
| 6,654,007 B2 | 11/2007 | Ito | |
| 7,339,580 B2 | 3/2008 | Westerman et al. | |
| 7,474,296 B2 | 1/2009 | Obermeyer et al. | |
| 2001/0016682 A1 | 8/2001 | Berner | |
| 2001/0019325 A1 | 9/2001 | Takekawa | |
| 2001/0022579 A1 | 9/2001 | Takeshi | |
| 2001/0026268 A1 | 10/2001 | Ito | |
| 2002/0019022 A1 | 2/2002 | Dunn | |
| 2002/0036617 A1* | 3/2002 | Pryor | 345/156 |
| 2002/0132279 A1 | 9/2002 | Hockersmith | |
| 2002/0185981 A1 | 12/2002 | Dietz | |
| 2003/0001825 A1 | 1/2003 | Omura et al. | |
| 2003/0063775 A1 | 4/2003 | Rafii | |
| 2003/0137494 A1* | 7/2003 | Tulbert | 345/173 |
| 2003/0231167 A1 | 12/2003 | Leung | |
| 2004/0033618 A1 | 2/2004 | Haass | |
| 2004/0046744 A1 | 3/2004 | Rafii | |
| 2004/0106163 A1 | 6/2004 | Workman | |
| 2005/0038674 A1 | 2/2005 | Braig | |
| 2005/0052427 A1 | 3/2005 | Wu et al. | |
| 2005/0106651 A1 | 5/2005 | Chaiken | |
| 2006/0022955 A1* | 2/2006 | Kennedy | 345/173 |
| 2006/0026521 A1 | 2/2006 | Hotelling et al. | |
| 2006/0026536 A1 | 2/2006 | Hotelling et al. | |
| 2006/0063218 A1 | 3/2006 | Bartkowiak | |
| 2007/0252821 A1 | 11/2007 | Hollemans et al. | |
| 2007/0268273 A1 | 11/2007 | Westerman et al. | |
| 2008/0211785 A1 | 9/2008 | Hotelling et al. | |

FOREIGN PATENT DOCUMENTS

| | | |
|---|---|---|
| EP | 0 881 592 | 12/1998 |
| JP | 2001-175807 | 6/2001 |
| WO | WO02/16905 | 2/2002 |

OTHER PUBLICATIONS

"Diamond Touch Applications" Mitsubishi Electric Research Laboratories, Aug. 2, 2004.

Bennon, Nancy, "Alternate Site Glucose Testing: A Crossover Design", Diabetes Technology & Therapeutics, vol. 4, No. 1, pp. 25-33, 2002.

Blank, T.B. et al., "Clinical Results from a Noninvasive Blood Glucose Monitor", Optical Diagnostics and Sensing of Biological Fluids and Glucose and Cholesterol Monitoring II., Proceedings of SPIE vol. 4624, pp. 1-10, 2002.

Diabetes Statistics, Bethesda, MD, National Institute of Health, Pub. No. 98-3926, Nov. 1997.

Fischer, Jerome S. et al., "Comparisons of Capillary Blood Glucose Concentrations from the Fingertips and the Volar Aspects of the Left and Right Forearm", Instrumentations Metrics, Inc., American Diabetes Association, 62 Annual Meeting, Jun. 14, 2002.

Hazen, Kevin H., "Glucose Determination in Biological Matrices Using Near-Infrared Spectroscopy", Doctoral Dissertation, University of Iowa, 1995.

Johnson, Paul C., Peripheral Circulation, New York, pp. 198, 1978.

Jungheim K. et al., "Glucose Monitoring at the Arm", Diabetes Care, vol. 25, No. 6, Jun. 2002.

Jungheim K. et al., "Risky Delay of Hypoglycemia Detection by Glucose Monitoring at the Arm", Diabetes Care, vol. 24, No. 7, pp. 1303-1304, Jul. 2001.

Jungheim, Karsten et al., "Response to Jungheim and Koschinsky" Diabetes Care, vol. 24, No. 7, pp. 1304-1306, Jul. 2001.

Khalil, Omar S., "Spectroscopic and Clinical Aspects of Noninvasive Glucose Measurements", Clinical Chemistry 45:2, pp. 165-177, 1999.

Klonoff, David C., "Noninvasive Blood Glucose Monitoring", Diabetes Care, vol. 20, No. 3, pp. 433-437, Mar. 1997.

Lee, Debra et al., "A Study of Forearm Versus Finger Stick Glucose Monitoring", Diabetes Technology & Therapeutics, vol. 4, No. 1 pp. 13-23, Jun. 2001.

Malin, Stephen F., et al., "Noninvasive Prediction of Glucose by Near Infrared Spectroscopy", Clinical Chemistry, vol. 45, No. 9, pp. 1651-1658, 1999.

McGarraugh, Geoff et al., "Glucose Measurements Using Blood Extracted from the Forearm and Finger", TheraSense, Inc., ART010022 Rev. C, 2001.

McGarraugh, Geoff et al., "Physiological Influences on Off-Finger Glucose Testing", Diabetes Technology & Therapeutics, vol. 3, No. 3, pp. 367-376, 2001.

Monfre, Stephen L. et al., "Physiologic Differences between Volar and Dorsal Capillary Forearm Glucose Concentrations and Finger Stock Concentrations", Instrumentations Metrics, Inc., American Diabetes Association, 62 Annual Meeting, Jun. 14, 2002.

Ohkudo, Yasuo et al., "Intensive Insulin Therapy Prevents the Progression of Diabetic Microvascular Complications in Japanese Patients with Non-Insulin-Dependent Diabetes Mellitus: A Randomized Prospective 6-year Study", Diabetes Research and Clinical Practice, vol. 28, pp. 103-117, 1995.

Peled, Nina et al., "Comparison of Glucose Levels in Capillary Blood Samples from a Variety of Body Sites", Diabetes Technology & Therapeutics, vol. 4, No. 1, pp. 35-44, 2002.

Ryan, T.J., "A Study of the Epidermal Capillary Unit in Psoriasis", Dermatologia 138: 459-472, 1969.

Sparks, Harvey V., "Skin and Muscle", Peripheral Circulation, New York, pp. 193-230, 1978.

Summary Minutes of the Clinical Chemistry and Clinical Toxicology Devices Meeting, Oct. 29, 2001.

Szuts, Ete Z. et al., "Blood Glucose Concentrations of Arm and Finger During Dynamic Glucose Conditions", Diabetes Technology & Therapeutics, vol. 4, No. 1, pp. 3-11, 2002.

Tamada Janet A et al., "Noninvasive Glucose Monitoring Comprehensive Clinical Results", JAMA vol. 282, No. 19, pp. 1839-1844, Nov. 17, 1999.

The Diabetes Control and Complications Trial Research Group, "The Effect of Intensive Treatment of Diabetes on the Development and Progression of Long-Term Complication in Insulin-Dependent Diabetes Mellitus", New Eng. J. Med., vol. 329, No. 14, pp. 997-86, Sep. 30, 1993.

Tranjanowski, Zlatko, et al., "Open-Flow Microperfusion of Subcutaneous Adipose Tissue for On-Line Continuous Ex Vivo Measurement of Glucose Concentration", Diabetes Care, vol. 20, No. 7, pp. 1114-1120, Jul. 1997.

Tranjanowski, Zlatko, et al., "Portable Device for Continuous Fractionated Blood Sampling and Continuous Ex Vivo Blood Glucose Monitoring", Biosensors & Bioelectronics, vol. 11, No. 5, pp. 479-487, 1996.

U.K. Prospective Diabetes Study (UKPDS) Group. "Intensive Blood-Glucose Control with Sulphonylureas or Insulin Compared with Conventional Treatment and Risk of Complications in Patients with Type 2 Ddiabetes (UKPDS 33)", The Lancet, vol. 352, Sep. 12, 1998.

U.S. Appl. No. 09/766,427 Hockersmith et al.

Welch, Matt et al., "Alternative Site: Fingertip vs. Forearm", Instrumentation Metrics, Inc., Internal Report, Dec. 12, 2001.

Zheng, Peng, et al., "Noninvasive Glucose Determination by Oscillating Thermal Gradient Spectrometry", Diabetes Technology & Therapeutics, vol. 2., No. 1, pp. 17-25, 2000.

M. Wu, C. Shen, K. Ryall, C. Forlines, and R. Balakrishnan. (2006); Gesture Registration, Relaxation, and Reuse for Multi-Point Direct-Touch Surfaces; in Proceedings of IEEE Tabletop 2006 Conference on Horizontal Interactive Human-Computer Systems, Adelaide, South Australia; 8 pages. M.Wu and R. Balakrishnan; (2003).

Multi-Finger and Whole Hand Gestural Interaction Techniques for Multi-User Tabletop Displays; ACM CHI Letters, 5(2); 193-202. ACM UIST 2003 Symposium on User Interface Software & Technology, Vancouver, Canada; Nov. 2003; pp. 193-202.

NCSA—National Center for Supercomputing Applications, "Functionality: Introduction, Functionality: Console Display, NCSA-GMSLab Team", Mississippi RiverWeb Museum Consortium, University of Illinois, 2003.

Paradiso, J., et al., "The Laser Wall", 1997.

Rekimoto, J. et al., "SmartSkin: An Infrastructure for Freehand Manipulations on Interactives Surfaces", Sony Computer Science Laboratories, 2002, CHI2002.

Ryall, K., et al., "DiamondTouch Applications", Mitsubishi Electric Research Laboratories, Aug. 2, 2004.

Small, C.H., "Touchscreens Provide a Robust and Intuitive User Interface", TechOnLine, 1996-2005.

Smart Technologies, Inc., Smart Board™ for Flat-Panel Displays—Interactive Overlay, 2003.

* cited by examiner

METHOD AND APPARATUS CONTINUING ACTION OF USER GESTURES PERFORMED UPON A TOUCH SENSITIVE INTERACTIVE DISPLAY IN SIMULATION OF INERTIA

CROSS-REFERENCE TO RELATED APPLICATIONS

This application is a continuation-in-part of the following earlier filed, copending application and claims the benefit thereof in accordance with 35 USC 120: U.S. patent application Ser. No. 10/913,105 entitled "Touch Detecting Interactive Display" filed on Aug. 6, 2004 in the names of W. Daniel Hillis, Bran Ferren, and Ryan McKinley. The foregoing application is fully incorporated herein by reference.

BACKGROUND OF THE INVENTION

1. Field of the Invention

The invention relates to interactive touch and force-sensitive displays controlled through user gestures. More particularly, the invention concerns the machine-implemented identification of particular human gestures from points of contact and applied force, and the implementation of predetermined machine-implemented actions pre-associated with the gestures.

2. Description of the Related Art

There are many situations in which people wish to collaboratively and interactively explore image-based data, for example by mutually looking at and manipulating a paper map. With large, table-like touch sensitive displays, a group of users can jointly view imagery. This is preferable to huddling around a single workstation or sitting at separate workstations and conversing by phone or email.

Imagery on table-like touch sensitive interactive displays is typically manipulated by a single user, either seated at a separate workstation or using physical controls on the display. For example, the National Center for Supercomputing Applications developed an interactive display with projected imagery, which is operated by a single user at a nearby control console. Although this approach has some benefits, some teams might find that this scheme does not permit them to interact with the display as intuitively and meaningfully as desired.

Another approach is Sony's SmartSkin interactive display, in which operators manipulate a computer's display using a limited set of gestures, such as panning and rotation. If used for certain applications such as geographic imagery however, users might find that the Sony system lacks image manipulating gestures that are sufficiently complex and intuitive. Consequently, users might experience a protracted learning curve, for example, by having to remember complicated interface commands.

Consequently, known multi-user touch sensitive interactive displays are not always completely adequate for all applications due to certain unsolved issues.

SUMMARY OF THE INVENTION

Broadly, one aspect of this disclosure concerns a method and apparatus for operating a multi-user interactive display system including a display having a touch-sensitive display surface. A position is detected of each contact site at which the display surface experiences external physical contact. Each contact site's position history is used to compute velocity data for the respective contact site. At least one of the following is used to identify occurrence of one or more user gestures from a predetermined set of user gestures: the position history and the velocity data. Each user gesture corresponds to at least one predetermined action for updating imagery presented by the display as a whole. Action is commenced corresponding to the identified gesture. Responsive to a user gesture terminating with a nonzero velocity across the display surface, action corresponding to the gesture is continued to simulate inertia imparted by said gesture.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1A:
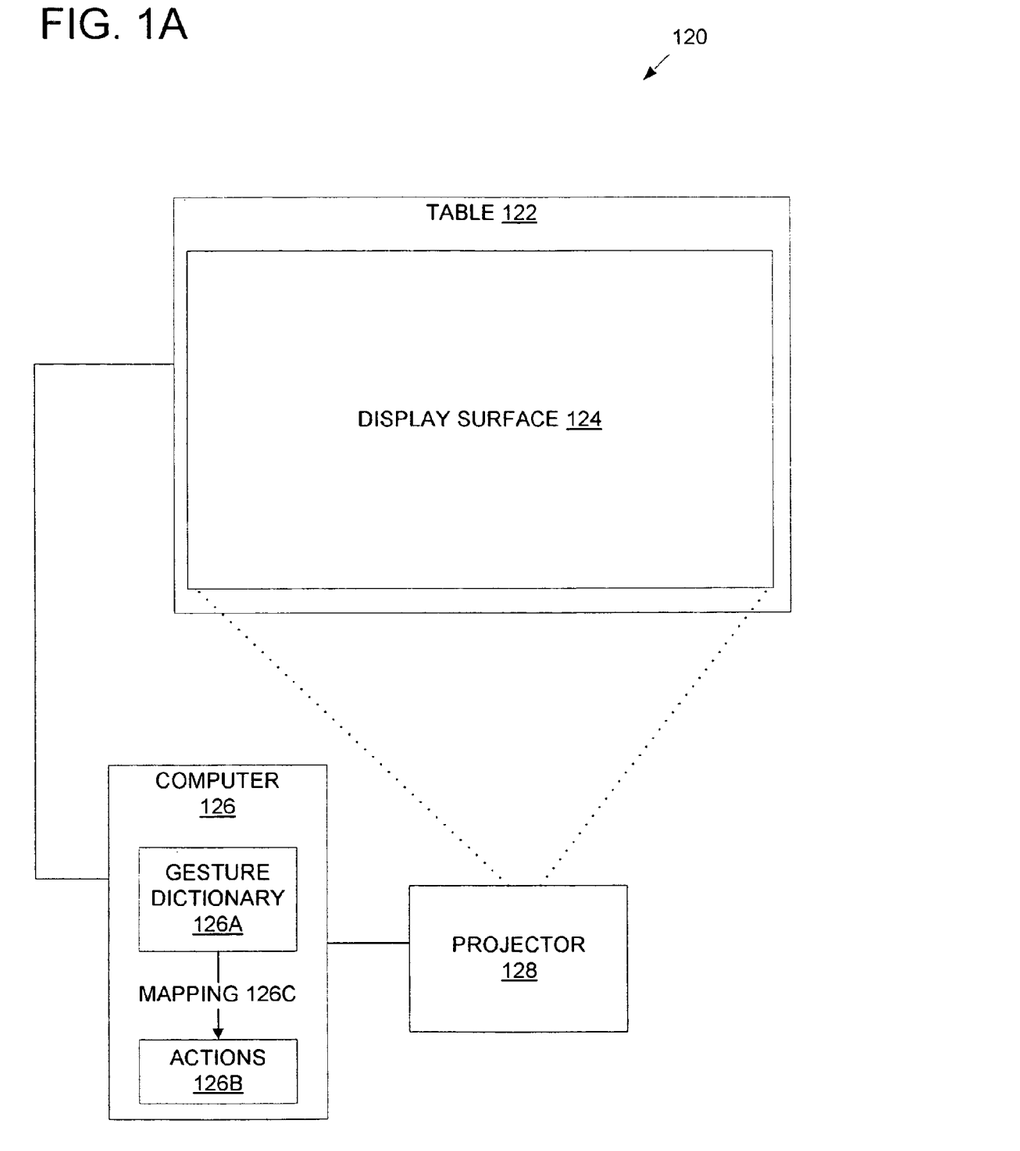
FIG. 1A is a block diagram of the hardware components and interconnections of an interactive multi-user touch sensitive interactive display system according to the invention.

One aspect of the disclosure concerns an interactive touch detecting display system, which may be embodied by various hardware components and interconnections, with one example being described in FIG. 1A. The system 120 includes a table 122 with a display surface 124, computer 126, and projector 128. The projector 128 projects imagery upon the display surface 124 under direction of the computer 126. As one example, the system 120 may be implemented by a touch detecting interactive display as disclosed in U.S. patent application Ser. No. 10/913,105, the entirety of which is incorporated by reference.

The table 122 detects touch input from human users as applied to the display surface 124, and provides signals to the computer 126 representing the position, size, timing, and other characteristics of user touch. Optionally, the table 122 may also detect applied force. Based upon this information, the computer 126 identifies one or more user gestures from a predefined set of defined gestures, and further identifies an action associated with each identified gesture. In this respect, the computer 126 includes a gesture dictionary 126*a*, listing of actions 126*b*, and mapping 126*c* between gestures and actions. The computer 126 interprets the table 122 output by using the dictionary 126*a* to identify the gesture performed by the user. The computer 126 then carries out appropriate action 126*c* corresponding to the user-performed gesture. The actions 126*c* comprise, for example, predetermined machine executable operations for updating imagery presented by the display.

The presently described embodiment of the system 120 facilitates user manipulation of the projected imagery as a whole, for example, through operations such as panning, zooming, rotating, and the like. This contrasts with personal computer applications, which use numerous separately movable icons. Still, the system 120 may use one or more peripheral menus or other control interfaces to support user manipulation of the subject imagery. Accordingly, the system 120 is particularly well suited to hands-on, intuitive, collaborative, multi-user study and manipulation of a large unitary item of imagery such as a photograph or map, presented upon the display 124.

Figure 1B:
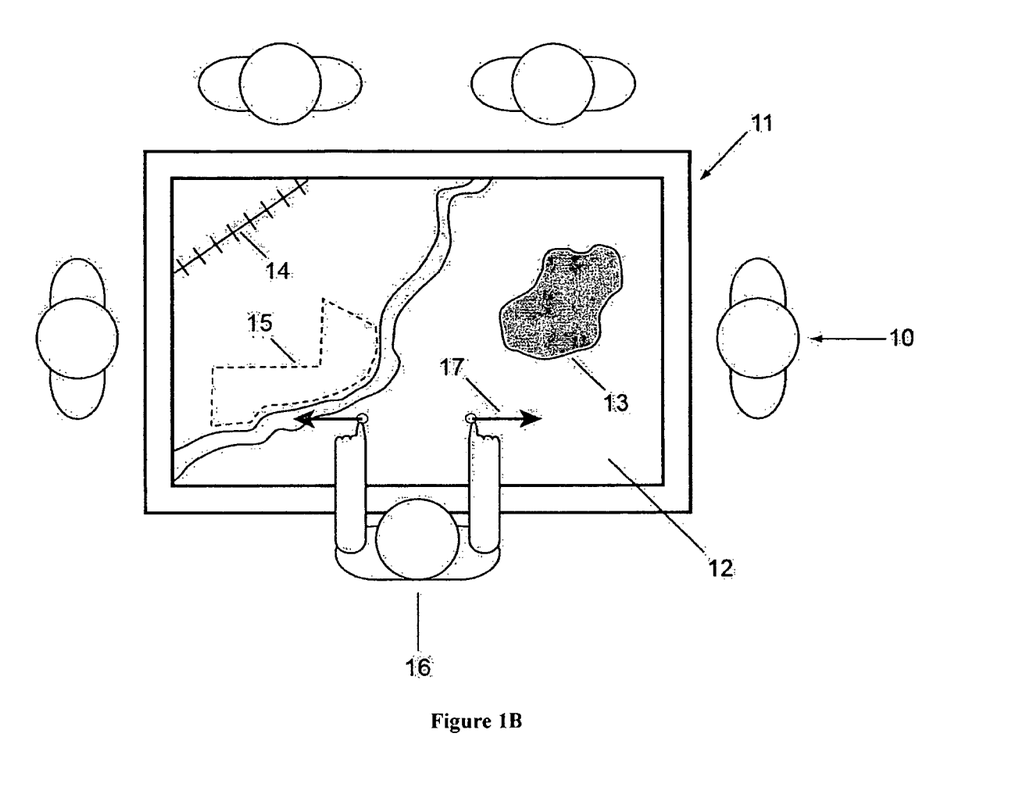
FIG. 1B is a plan view showing several users operating an interactive, touch detecting display according to the invention.

In this respect, FIG. 1B shows several users operating an interactive, touch detecting display 11. The users 10 surround the display 11, such that each user can view the display surface 12, which shows imagery of interest to the users. For example, the display may present Geographic Information System (GIS) imagery characterized by geographic 13, economic 14, political 15, and other features, organized into one or more imagery layers. Because the users can comfortably surround and view the display, this readily facilitates group discussion and interaction with the display. In the example of FIG. 1B, a user 16 has gestured 17 by placing his fingertips on the display surface and moving them in an outwardly separating manner. As discussed in greater detail below, this particular gesture 17 is associated with a zoom-in command. When the computer 126 performs a zoom-in command, it directs the system 120 to provide a closer, more detailed view of the displayed imagery.

Figure 1C:
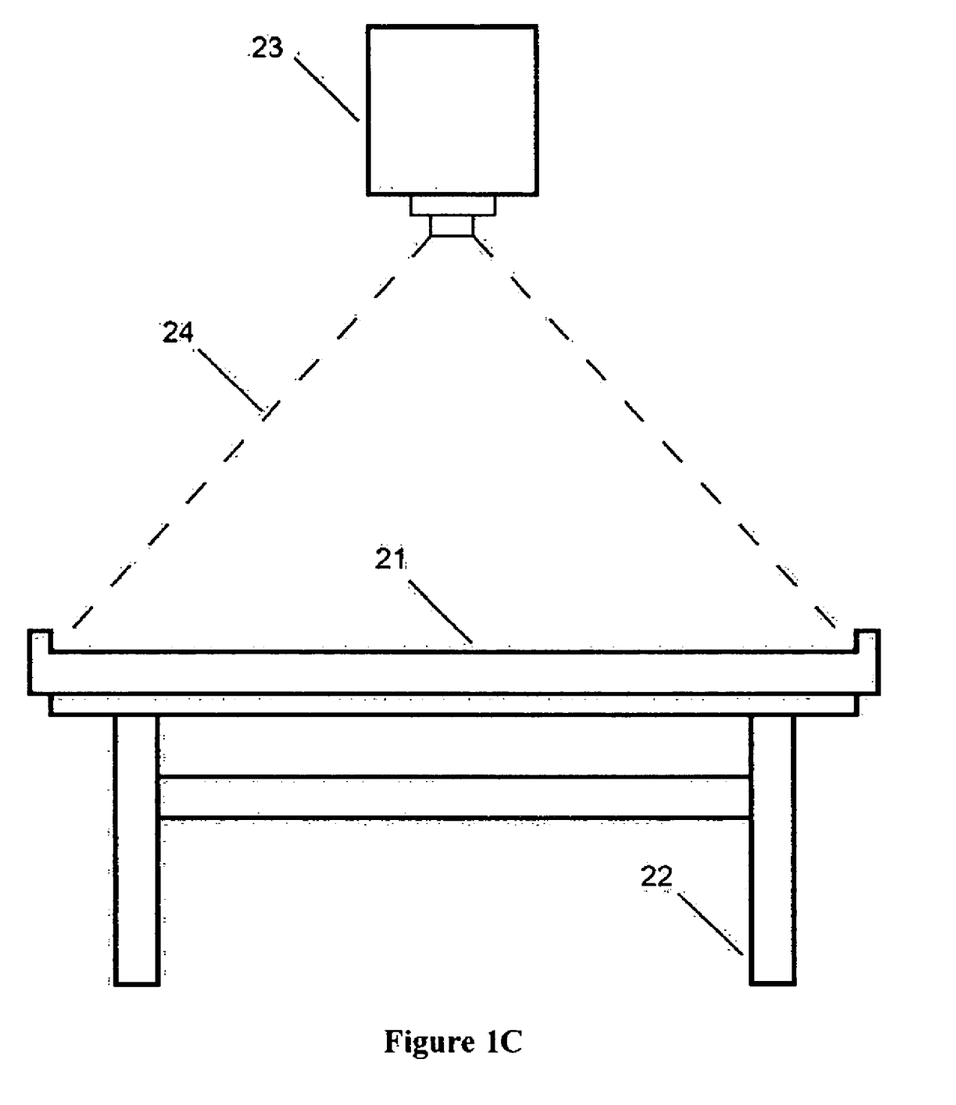
FIG. 1C shows a side view of an interactive, touch detecting, tabletop projection display according to the invention.

FIG. 1C shows a side view of the components 124, 128. The display surface is a horizontally oriented, planar projection surface 21 supported by a table-like structure 22. The structure in this example supports the projection surface at waist level for adult users, allowing the users to view and touch the entirety of the projection surface comfortably. The displayed imagery is generated by a projector 23 located above and projecting 24 downward onto the projection surface.

While projection from above onto a horizontally oriented display is illustrated, this disclosure also contemplates other display surface orientations, projector configurations, and display technologies. For example, a horizontally oriented rear-projection surface may be used as the display surface, with the projector mounted below the display surface and projecting upward. This approach eliminates shadows that could be generated when a user may position his body between the projector and the projection surface. The display may also be mounted in a vertical orientation and affixed to a wall or other supporting structure. A non-projection embodiment is also contemplated, employing thin profile display technologies such as LCD's, OLED's, or plasma displays. Despite the foregoing examples, skilled artisans in the relevant areas of technology will appreciate a further variety of suitable display technologies.

A possible consequence of the horizontal orientation of the display surface is a natural inclination of users to rest a hand on the projection surface for support, especially when leaning forward to point to objects near the center of the projection surface. To avoid erroneously interpreting such contact with the display as a gesture, the projection surface may be surrounded by a small railing (not shown). This railing provides a visual cue that discourages users from leaning onto the display, and also provides structural support should a user lean in toward the center of the display.

Referring to FIG. 1A, the table 122 may employ various approaches to detect when and where a user touches the display surface. In one embodiment, a set of infrared emitters and receivers (not shown) is arrayed around the perimeter of the display surface 124, oriented such that each emitter emits light in a plane a short distance above the display surface. The table 122 determines the location where the user is touching the projection surface by considering whether each emitters is occluded (or not) as viewed from each of the receivers. As one example, a configuration incorporating a substantially continuous set of emitters around the perimeter and three receivers, each positioned in a corner of the projection surface, may be used to resolve multiple locations of contact.

As an alternative, the table 122 may employ a resistive touch pad, such as those commonly used in laptop computers, placed beneath the display surface 124, which is flexible. The resistive touch pad comprises two layers of plastic that are separated by a compressible insulator such as air, and a voltage differential is maintained across the separated layers. When the upper layer is touched with sufficient pressure, it is deflected until it contacts the lower layer, changing the resistive characteristics of the upper to lower layer current pathway. By considering these changes in resistive characteristics, the computer 126 can determine the location of contact.

In yet another embodiment, the table 122 employs a thin layer of liquid crystal film or other material that changes optical properties in response to pressure. The thin layer is placed beneath the display surface 124, which is flexible. One or more video cameras trained on the underside of the material capture the changes in optical properties that occur when a user touches the projection surface and therefore applies pressure to the thin layer. The location of contact is then determined by using the computer 126 to analyze the video camera images.

In another embodiment, the table 122 employs ultrasound used to detect contact information. Another embodiment uses capacitive touch pads, with one example being the Synaptics TouchPad™ product. A variety of capacitive touch pads are available commercially, and described in various publications. Furthermore, the table 122 may employ a combination of some of the foregoing schemes, such as IR together with ultrasound.

In any case, the detection scheme employed by the table 122 periodically provides a machine readable output signal to the computer 126, which is representative of the time and location of user contact with the display surface 124. In one embodiment, the table 122 signifies time by providing a signal representative of the timing of user contact; in another embodiment, the table 122 indicates timing by providing its location output signal in real-time. In turn, the computer 126 analyzes the information from the table 122 to identify user gestures. Depending upon the implementation, the table output may comprise a raw signal corresponding to the physics of the detection mechanism, or a more refined signal indicative of actual contact position. Thus, the computer 126 may further serve to interpret the table's output to develop a Cartesian or other representation of touch position.

As an optional enhancement, the display surface 124 may be mounted on load cells or other devices that sense force of the user contact on the display surface 124. In this embodiment, the table 122 additionally provides the computer 126 with a signal representing the applied force. As described in greater detail below, the computer 126 may employ the detected force to supplement the identification of gestures. One example, illustrated below in greater detail, permits the user to apply force to slow imagery that has been set in motion using simulated inertia. Similarly, the computer 126 may also use force intensity to determine the gain or attenuation applied to the velocity used to carry out the identified gestures.

Exemplary Digital Data Processing Apparatus

Data processing entities such as the computer 126 may be implemented in various forms. One example is a digital data processing apparatus, as exemplified by the hardware components and interconnections of the digital data processing apparatus 100 of FIG. 1D.

Figure 1D:
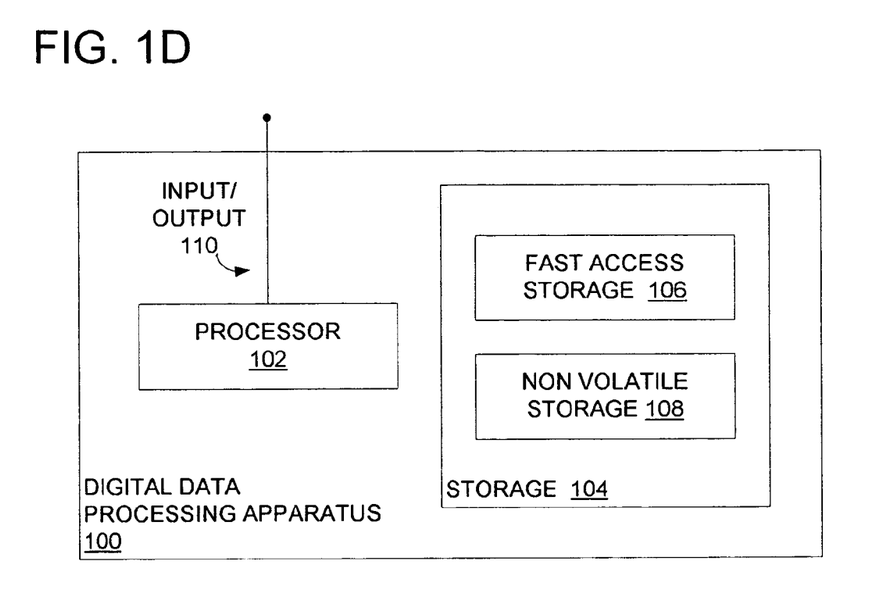
FIG. 1D is a block diagram of a digital data processing machine according to the invention.

The apparatus 100 includes a processor 102, such as a microprocessor, personal computer, workstation, controller, microcontroller, state machine, or other processing machine, coupled to a storage 104. In the present example, the storage 104 includes a fast-access storage 106, as well as nonvolatile storage 108. The fast-access storage 106 may comprise random access memory ("RAM"), and may be used to store the programming instructions executed by the processor 102. The nonvolatile storage 108 may comprise, for example, battery backup RAM, EEPROM, flash PROM, one or more magnetic data storage disks such as a hard drive, a tape drive, or any other suitable storage device. The apparatus 100 also includes an input/output 110, such as a line, bus, cable, electromagnetic link, or other means for the processor 102 to exchange data with other hardware external to the apparatus 100.

Despite the specific foregoing description, ordinarily skilled artisans (having the benefit of this disclosure) will recognize that the apparatus discussed above may be implemented in a machine of different construction, without departing from the scope of the invention. As a specific example, one of the components 106, 108 may be eliminated; furthermore, the storage 104, 106, and/or 108 may be provided on-board the processor 102, or even provided externally to the apparatus 100.

Logic Circuitry

Figure 1E:
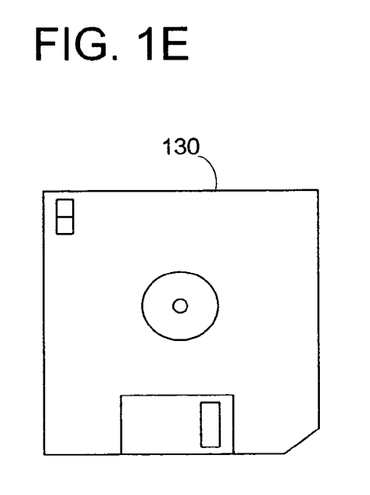
FIG. 1E shows an exemplary signal-bearing medium according to the invention.
Figure 1F:
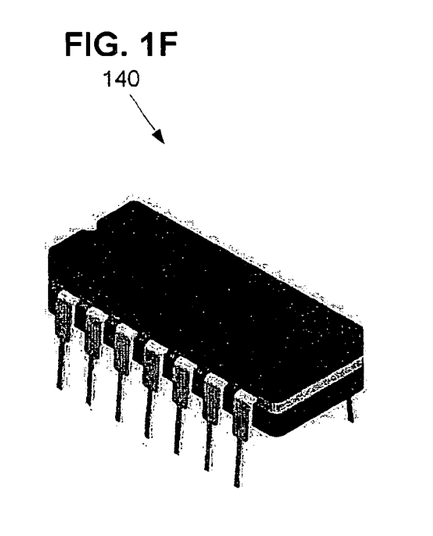
FIG. 1F shows exemplary logic circuitry according to the invention.

In contrast to the digital data processing apparatus discussed above, a different embodiment of this disclosure uses logic circuitry instead of computer-executed instructions to implement processing entities of the system 120. FIG. 1F shows exemplary logic circuitry 140. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present disclosure, the operational aspect of the disclosure will now be described. As mentioned above, one operational aspect of this disclosure generally involves the identification of particular touch-based user gestures from points of contact, velocity, and/or applied force, and implementing of predetermined actions associated with the gestures. Although the present invention has broad applicability to touch based computing systems, the explanation that follows will emphasize the application of FIGS. 1A-1C in order to explain a useful and tangible example; no limitation is intended by use of this example.

Signal-Bearing Media

Wherever the functionality of any operational components of the disclosure is implemented using one or more machine-executed program sequences, these sequences may be embodied in various forms of signal-bearing media. In the context of FIG. 1D, such a signal-bearing media may comprise, for example, the storage 104 or another signal-bearing media, such as a magnetic data storage diskette 130 (FIG. 1E), directly or indirectly accessible by a processor 102. Whether contained in the storage 106, diskette 130, or elsewhere, the instructions may be stored on a variety of machine-readable data storage media. Some examples include direct access storage, e.g. a conventional hard drive, redundant array of inexpensive disks ("RAID"), or another direct access storage device ("DASD"), serial-access storage such as magnetic or optical tape, electronic non-volatile memory, e.g. ROM, EPROM, flash PROM, or EEPROM, battery backup RAM, optical storage e.g. CD-ROM, WORM, DVD, digital optical tape, or other suitable signal-bearing media including analog or digital transmission media and analog and communication links and wireless communications. In one embodiment, the machine-readable instructions may comprise software object code, compiled from a language such as assembly language, C, etc.

Logic Circuitry

In contrast to the signal-bearing medium discussed above, some or all functional components may be implemented using logic circuitry such as 140 (FIG. 1F), instead of using a processor to execute instructions. Such logic circuitry is therefore configured to perform operations to carry out the method of the disclosure. The logic circuitry may be implemented using many different types of circuitry, as discussed above.

Overall Sequence of Operation

Figure 2:
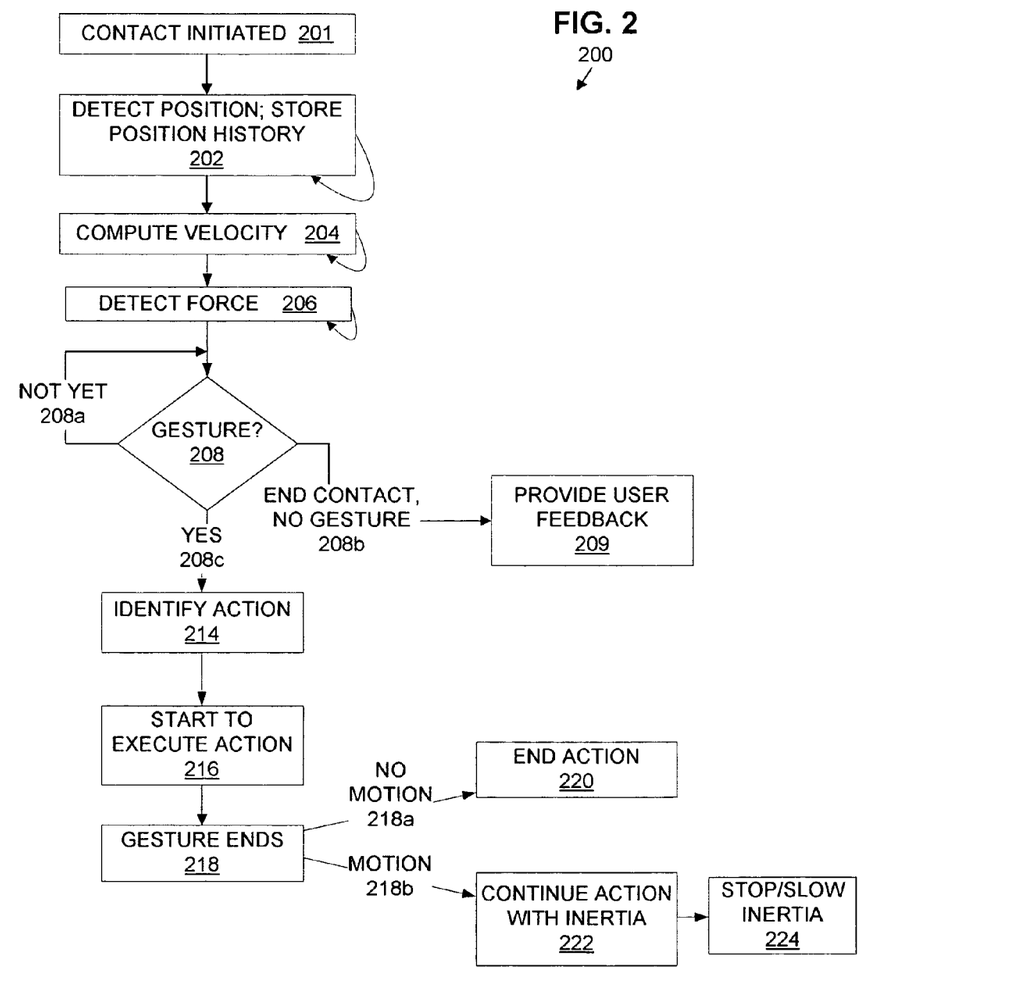
FIG. 2 is a flowchart of a sequence for operating a multi-user touch sensitive interactive display system according to the invention.

FIG. 2 shows a sequence 200 to illustrate one example of the method aspect of this disclosure. Broadly, this sequence serves to detect and analyze contact points, history, velocity, and/or applied force to recognize user application of predefined touch-based user gestures, and thereafter implement predetermined actions pre-associated with the recognized gestures. As described in further detail below, optional features such as inertia, touch initiated object slowing, friction, and others may be implemented. For ease of explanation, but without any intended limitation, the example of FIG. 2 is described in the context of the interactive touch input system of FIGS. 1A-1C.

Broadly, the steps 202, 204, 206 run continuously to process user contact with the display surface 124 as it occurs. Steps 202, 204, 205 therefore serve to analyze contact occurring when the user contacts the surface 124 at one or more contact regions using one or more fingers, hands, arms, etc. As explained in greater detail below, step 208 analyzes the history of position, velocity, force, and other touch characteristics to recognize when the user has performed a recognized gesture.

The sequence 200 is now described in greater detail. As an example, the sequence 200 may be initiated upon boot up, reconfiguration, initialization, or other startup of the system 120. In step 201, the user initiates, and the display/computer detects, the user's physical contact with the display surface 124. Without any intended limitation, the illustrated embodiment of the sequence 200 performs one instance of the (repeating) steps 202-204 for each such contact initiated. The contact of step 201 is referred to as the current contact. In one gesture recognition scheme, the computer 126 tracks a predetermined number of distinct contact locations (such as two). If the computer identifies another contact location (such as a third), the computer 126 ignores it until the user releases a sufficient number of the existing contact locations.

In step 202, the table 122 detects and monitors the position, size, shape, and timing of the current contact region. Namely, the table 122 provides a machine readable output to the computer 126, which is representative of the position, size, shape, and timing of each contact region, or contains information from which this information can be calculated or derived. The timing output may be satisfied, for example, by the table 122 providing its output in real time. Also in step 202, the computer 126 stores a position history for each contact region. The position history provides a record of how each contact region moves or and/or changes shape over time.

In step 204, the computer 126 computes and monitors the velocity (if any) of the subject contact that is occurring by analyzing the contact's position history. The computed velocity may comprise an instantaneous velocity, average velocity over some or all of the past, moving average, or other suitable computation.

In step 206, the table 122 detects and monitors the force by which the current user contact is being applied. As a specific example, this may occur by the table 122 detecting applied pressure of the current contact, using a mechanism such as load cells, solid state force sensors, or other devices, or by assuming that applied force increases or decreases proportionally to the size of the contact region. To provide some examples, step 206 may be performed concurrently with step 202, in series (as shown), or omitted entirely. Also in step 206, the table 122 provides a machine-readable output to the computer 126, this signal representing the detected force or containing information by which force can be derived or computed.

In step 208, the computer 126 determines whether activity of the current contact matches a predetermined pattern, and therefore constitutes a gesture. Step 208 repeats continually, utilizing some or all of the position, position history (movement), velocity, and force information from steps 202, 204, 206. More particularly, in step 208 the computer 126 compares the history of contact position, size, movement, velocity, and/or force to the dictionary 126a of predetermined gestures to determine if the user has performed any of these gestures.

As long as the current contact continues, but no gesture has been detected, step 208 repeats (via 208a). If the current contact ends but no gesture is detected (208b), then the computer 126 may optionally provide feedback to the user that an attempted gesture was not recognized (step 209). Feedback may be provided, for example, by audible alert, visual alert, error log, etc. In contrast, if step 208 detects that the user has initiated a gesture (208c), the computer in step 214 uses the mapping 126c to identify the action 126b associated with the gesture that was identified in step 208. As mentioned above, the predefined actions include various machine implemented operations for updating the presentation of imagery by the display. In one embodiment, gestures are both identified (208) and associated (214) with display control commands via a single procedure.

After step 214, the computer 126 initiates performance of the identified action (step 216). As described in greater detail below, some examples of actions 126b include panning, zooming, rotating, and the like. Thus, step 216 starts the requested pan, zoom, rotate, or other operation.

In step 218, the computer/display detects that the current gesture has ended because the user terminated contact with the display. In a simple embodiment, the computer 126 may respond to termination of the current gesture by ending the associated action (step 220). However, by simulating physical properties, such as inertia and friction, the system 120 can more closely approximate the look and feel of manipulating a physical object. An important consequence of these properties is that motion of the displayed imagery can continue, and subsequently cease, after the initiating points of contact are removed. Therefore, in step 218 the computer 126 considers whether the gesture terminated with a non-zero velocity. In other words, step 218 determines whether, at the moment the user ended the current gesture by terminating contact with the display surface, the contact region was moving. Step 218 may conclude that the gesture ended with motion if there was any motion whatsoever, or step 218 may apply a predetermined threshold, e.g. one inch per second, above which the contact region is considered to be moving.

If the current gesture ended with a zero velocity, or a nonzero velocity that did not meet the threshold, then step 218 progresses (via 218a) to step 220, where the computer 126 terminates the action being performed for the subject gesture. In contrast, if the current gesture ended with a nonzero velocity, step 218 advances (via 218b) to step 222, which executes the action in a manner that imparts inertia to the action.

For example, if the action identified in step 214 was rotate, then the computer 126 in step 222 directs the projector 128 to additionally continue the requested rotation after the gesture terminates. In one embodiment, the imparted inertia may be proportional to the nonzero velocity at gesture termination (computed at 204), which may serve to simulate continuation of the motion that was occurring when the gesture terminated.

Another example is where the computer 126 detects (FIG. 2, step 208) that the user has initiated a pan gesture by drawing a finger across the display surface at a particular velocity, and lifted his/her finger from the surface while still moving (FIG. 2, step 218b). With the optional inertia feature enabled, the computer 126 continues (FIG. 2, step 222) to pan the imagery in the initiated direction at the velocity implied by the gesture at the time the finger was lifted until a stopping or slowing naturally occurs (step 224). If the velocity when the finger was lifted is low, the computer 126 pans the display at a correspondingly slow rate, useful for slowly panning across imagery. Alternatively, if the computer 126 detects a panning gesture terminated at a rapid velocity, the computer 126 quickly translates the imagery in the desired direction, without the need for repeated panning gestures to continue movement. The computer 126 similarly recognizes user termination of other gestures with residual velocity, such as rotation and zoom, with inertia continuing the appropriate motion until stopped.

With various techniques, the routine 200 may slow the imparted inertia as illustrated by step 224. For example, without user contact, the computer 126 may slow the inertia at a predetermined rate to simulate friction. As another example, upon new user contact after terminating the gesture with inertia, the computer 126 may (1) slow the inertia in proportion to force exerted by the user, the size of the contact area, or other properties, (2) abruptly terminate the inertia, thus bringing the motion of the imagery to an immediate stop, (3) terminate the inertia and immediately impart a motion correlating with the new contact, or (4) perform another action.

One example of a slowing gesture (step 224) comprises placing the finger or hand on the display surface, as if stopping a spinning globe. In response to this gesture, the computer 126 may slow movement at a rate that is proportional to the force with which the gesture is applied or to the area of contact. For example, responsive to the user lightly touching a finger, the computer 126 cause drag and gradually slows the motion. Likewise, responsive to a firmer touch or wider area of contact, such as a whole hand, the computer 126 more briskly slows the motion, or immediately stops entirely. This graduated response is useful when, for example, the imagery is panning at high speed and the desired location is approaching. Thus, the user can gently slow down the display with a light touch then press firmly when the location is reached. In an alternative embodiment, the computer 126 ceases motion at the first tap or other touch.

In one embodiment, the computer 126 is responsive to user input to enable, disable, and/or adjust the above described inertia, friction, and such properties. For example, a simulated friction coefficient governs the degree to which the imagery motion slows over time. With the friction coefficient is set to zero or inactive, the computer 126 utilizes a simulated friction of zero, and continues motion at the initiated velocity until stopped by the user through a stopping gesture. In contrast, with the friction coefficient set to a nonzero value, the computer 126 slows the motion of the imagery at the given rate. The computer 126 may also recognize an adjustable threshold for determining motion (218) or no motion (218b).

Some Exemplary Gestures

Pan

Figure 3A:
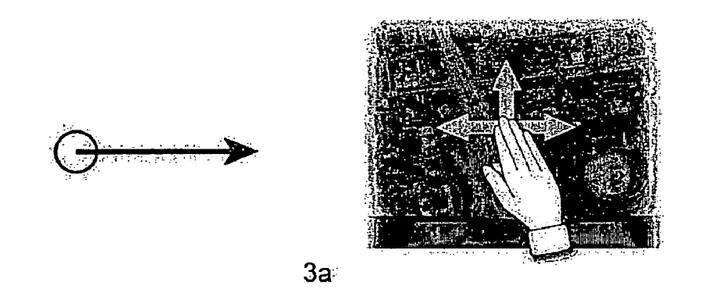
FIG. 3A shows a schematic and a representation of a panning gesture according to the invention.

Panning is one exemplary gesture. If the computer 126 detects (step 214) that a user establishes and then moves a single contact location, the computer 126 executes (step 216) a panning movement, that is, translation of the imagery as a whole in the direction of the movement. FIG. 3A shows an example of this. The direction and rate of the pan is determined by the velocity of the contact site.

Zoom

Figure 3B:
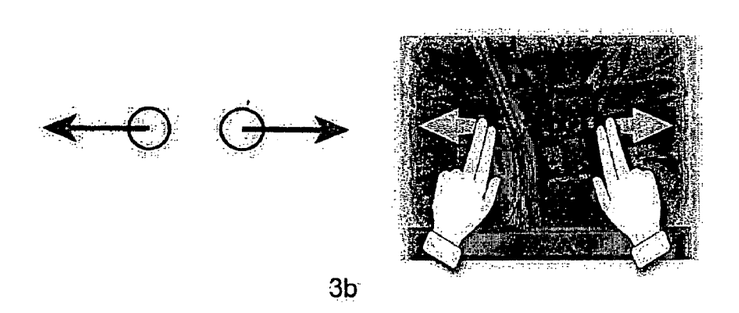
FIG. 3B shows a schematic and a representation of a zoom-in gesture according to the invention.
Figure 3C:
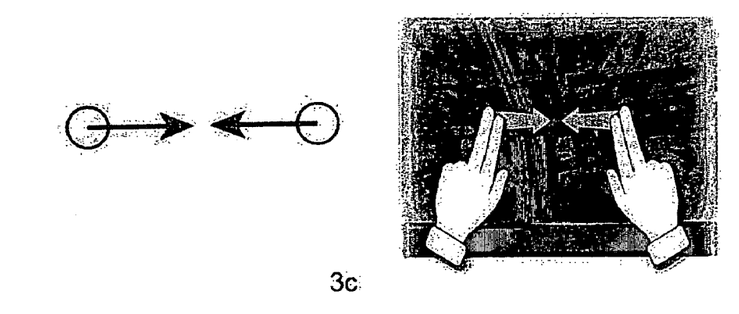
FIG. 3C shows a schematic and a representation of a zoom-out gesture according to the invention.

Zoom is another exemplary gesture. If the computer 126 detects (step 214) the user establishing two contact locations and initiating a separating motion (FIG. 3B), the computer 126 executes (step 216) an inward zoom of the imagery as a whole. FIG. 3C shows a schematic and a representation of an outward zoom, comprising an approaching motion of the two contact locations.

Rotation

Figure 3D:
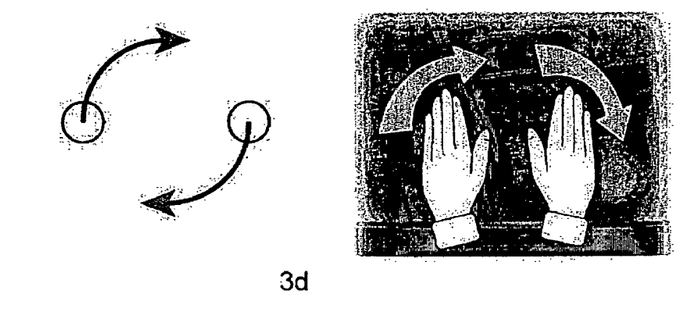
FIG. 3D shows a schematic and a representation of a rotation gesture according to the invention.

FIG. 3D shows a schematic and a representation of a rotation gesture, comprising a user establishing two contact locations and initiating a rotary motion of the locations at a substantially fixed radius about a center of rotation. When the computer 126 detects (step 214) a clockwise (or counterclockwise) motion, the computer 126 executes (step 216) a corresponding rotation of the imagery as a whole, about the center of rotation.

Gesture Speed

As mentioned above, the computer 126 alters the display through zoom, pan, rotate, or other actions in step 216. In one embodiment, the rate at which such display changes occur may be proportional to the magnitude of the velocity of the contact point within the gesture, as measured in step 204. For those gestures consisting of two contact points, the computer 126 may consider the velocity of either one of the contact points, an average velocity, etc. The computer 126 may further apply a gain or attenuation to the resulting magnitude to provide the desired balance of speed and precision in display control.

Optionally, the computer 126 may further alter the rate of display changes in proportion to the force with which a gesture is applied. For example, the computer 126 may carry out the action associated with a gesture more quickly in response to a greater input force.

Combined Gestures

In addition to the basic motions described, the computer 126 may recognize combined gestures to effect more complicated changes in the displayed imagery. For example, the computer 126 may be programmed to recognize (214) the user's establishing a right and a left contact location and initiating an offset separating motion, upward on the right and downward on the left. In response, the computer 126 performs (step 216) a combined inward zoom and counterclockwise rotation.

To avoid user confusion or disorientation when combined gestures are attempted, such as an imperfect attempt to simply zoom inward, the computer 126 may be programmed as discussed above to provide feedback (step 209) to the user when contact terminates without defining a recognized gesture. As an alternative, the computer 126 may interpret the combined gesture as one or the other of the attempted gestures, insofar as one can be identified.

Additional Gestures

Although the foregoing description provides an exemplary set of basic gestures, those skilled in the art will appreciate that many additional gestures may be devised, and different commands may be associated with the existing or additional gestures. For example, certain gestures may be desirable based on the geometry of the touch display.

For example, the computer 126 may recognize (step 214) a "lazy Susan" gesture, to which the computer 126 responds (step 216) by rotating the displayed imagery as a whole upon a predetermined point of rotation. In one example, the touch table may use a circular or semicircular configuration (either by computer manipulated display or by physical shape). In this case, the computer 126 responds to any linear or arcing gesture to rotate the display about a predetermined point, as if setting a rotating disk or "lazy Susan" in motion. Optionally, the computer 126 may limit recognition of the lazy Susan gesture to the gestures performed at the outer periphery of the touch table.

Figure 4:
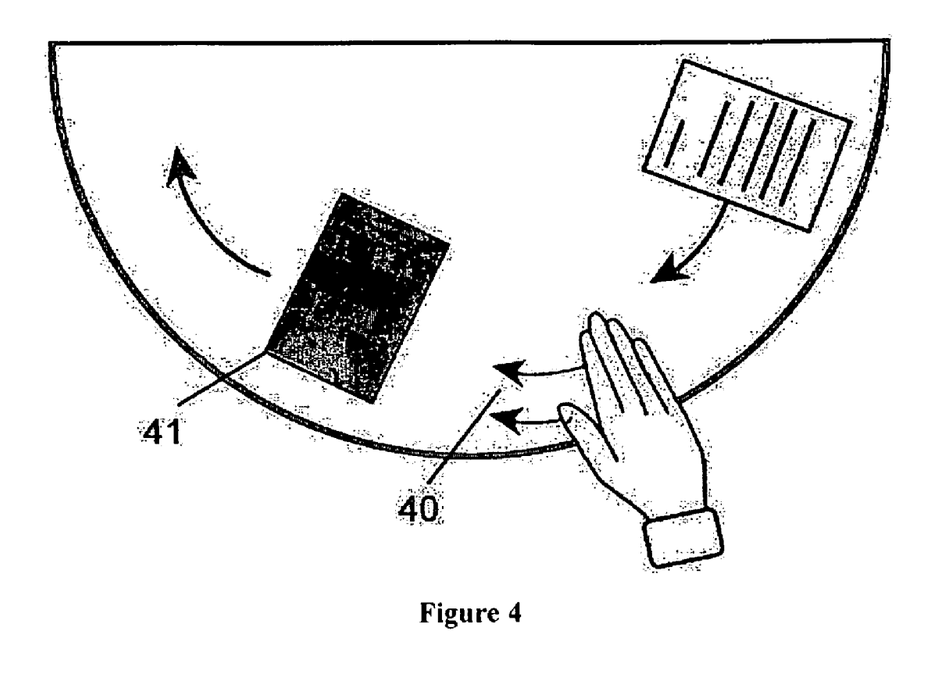
FIG. 4 shows a gesture performed to rotate imagery about the center of a circular or semicircular display according to the invention.

In another embodiment, the touch table is not pre-configured in a circular or semicircular configuration. In this environment, the computer 126 recognizes an arc-shaped gesture or other sweeping semicircular motion 40 (FIG. 4) as the lazy Susan gesture. Optionally, the computer 126 may limit recognition of this gesture to the circumference of the table. The resulting action rotates imagery 41 about the display center, simulating a physical rotation of the underlying display surface.

Other Embodiments

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A computer implemented method for operating an interactive display system including a display having a touch-sensitive display surface, the method comprising the operations of:
   detecting a position of each contact site at which the display surface experiences physical contact;
   utilizing each contact site's position history to compute velocity data for the respective contact site;
   utilizing at least one of the following to identify occurrence of one or more user gestures from a predetermined set of user gestures: the position history, the velocity data;
   wherein each user gesture corresponds to at least one predetermined action for updating, as a whole, all imagery presented by the display;
   commencing the action corresponding to the identified gesture; and
   responsive to a user gesture terminating with a nonzero velocity across the display surface, continuing the action corresponding to the gesture so as to simulate inertia imparted by said gesture.

2. At least one non-transitory computer-readable storage medium containing a program of machine-readable instructions executable by a digital data processing machine to perform operations for operating an interactive display system including a display having a touch-sensitive display surface, the operations comprising:
   detecting a position of each contact site at which the display surface experiences physical contact;
   utilizing each contact site's position history to compute velocity data for the respective contact site;
   utilizing at least one of the following to identify occurrence of one or more user gestures from a predetermined set of user gestures: the position history, the velocity data;
   wherein each user gesture corresponds to at least one predetermined action for updating, as a whole, all imagery presented by the display;
   commencing the action corresponding to the identified gesture; and
   responsive to a user gesture terminating with a nonzero velocity across the display surface, continuing the action corresponding to the gesture so as to simulate inertia imparted by said gesture.

3. Circuitry of multiple interconnected electrically conductive elements configured to perform operations for operating an interactive display system including a display having a touch-sensitive display surface, the operations comprising:
   detecting a position of each contact site at which the display surface experiences physical contact;
   utilizing each contact site's position history to compute velocity data for the respective contact site;
   utilizing at least one of the following to identify occurrence of one or more user gestures from a predetermined set of user gestures: the position history, the velocity data;
   wherein each user gesture corresponds to at least one predetermined action for updating, as a whole, all imagery presented by the display;
   commencing the action corresponding to the identified gesture; and
   responsive to a user gesture terminating with a nonzero velocity across the display surface, continuing the action corresponding to the gesture so as to simulate inertia imparted by said gesture.

4. An interactive display system, comprising:
   a display having a touch-sensitive display surface;
   a sensing device to detect position of each contact site at which the display experiences physical contact;
   a digital data processing machine programmed to perform operations comprising:
      utilizing each contact site's position history to compute velocity data for the respective contact site;
      utilizing at least one of the following to identify occurrence of one or more user gestures from a predetermined set of user gestures: the position history, the velocity data;

wherein each user gesture corresponds to at least one predetermined action for updating, as a whole, all imagery presented by the display;

commencing the action corresponding to the identified gesture; and responsive to a user gesture terminating with a nonzero velocity across the display surface, continuing the action corresponding to the gesture so as to simulate inertia imparted by said gesture.

5. An interactive display system, comprising:

display means for providing a touch-sensitive display surface;

sensing means for detecting position of each contact site at which the display experiences physical contact;

processing means for performing operations comprising:

utilizing each contact site's position history to compute velocity data for the respective contact site;

utilizing at least one of the following to identify occurrence of one or more user gestures from a predetermined set of user gestures: the position history, the velocity data;

wherein each user gesture corresponds to at least one predetermined action for updating, as a whole, all imagery presented by the display;

commencing the action corresponding to the identified gesture; and responsive to a user gesture terminating with a nonzero velocity across the display surface, continuing the action corresponding to the gesture so as to simulate inertia imparted by said gesture.

6. The invention of claim 1 or 2 or 3 or 4 or 5, where:

the operations further comprise sensing a force exerted at each of the contact sites;

the operation of identifying one or more gestures further utilizes the sensed force.

7. The invention of claim 1 or 2 or 3 or 4 or 5, where:

the operations further comprise sensing a force exerted at each of the contact sites;

the operation of commencing the action corresponding to the identified gesture comprises performing the action at a speed proportional to the sensed force.

8. The invention of claim 1 or 2 or 3 or 4 or 5, further responsive to a user gesture terminating with a nonzero velocity across the display surface, slowing the action at a predetermined rate so as to simulate friction.

9. The invention of claim 1 or 2 or 3 or 4 or 5, the operations further comprising:

responsive to occurrence of new physical contact with the display while an action from a gesture is being continued, slowing the action at a predetermined rate.

10. The invention of claim 1 or 2 or 3 or 4 or 5, the operations further comprising:

responsive to occurrence of new physical contact with the display while an action from a gesture is being continued, slowing the action at a rate proportional to force of the new contact.

11. The invention of claim 1 or 2 or 3 or 4 or 5, the operations further comprising:

responsive to occurrence of new physical contact with the display while an action from a gesture is being continued, slowing the action at a rate proportional to surface area of the new contact.

12. The invention of claim 1 or 2 or 3 or 4 or 5, the operations further comprising:

responsive to occurrence of new physical contact with the display while an action from a gesture is being continued, ceasing the action.

13. The invention of claim 1 or 2 or 3 or 4 or 5, further comprising:

limiting the continuing of the action to occurrences where the gesture is terminated with a velocity that exceeds a predetermined rate.

14. The invention of claim 1 or 2 or 3 or 4 or 5, where:

the predetermined set of user gestures includes a lazy Susan user gesture comprising at least one point of user contact with the display surface traversing one of the following patterns: an arc, a substantially straight line;

the predetermined action associated with the lazy Susan user gesture comprises rotating, as a whole, all imagery presented by the display about a predetermined point.

15. The invention of claim 1 or 2 or 3 or 4 or 5, where:

the operations further comprise sensing a force exerted at each of the contact sites;

the operation of commencing the action corresponding to the identified gesture commences the action at a speed proportional to the exerted force.

* * * * *